Dec. 23, 1941. F. A. KRUSEMARK 2,267,406
TIRE
Filed March 1, 1939
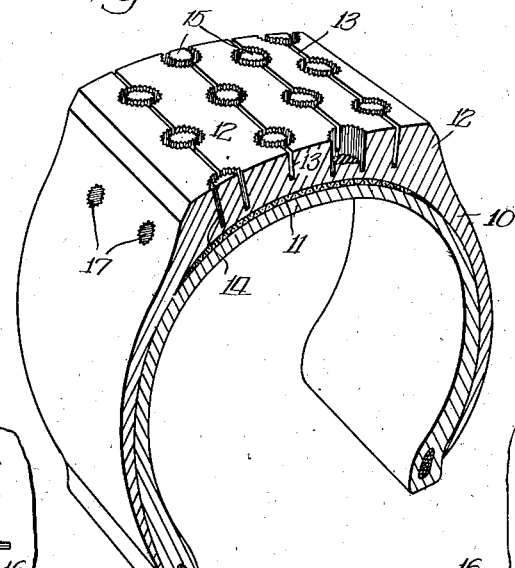
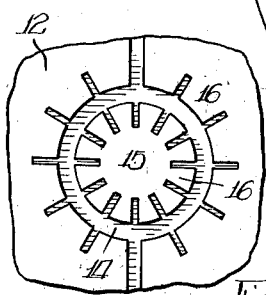
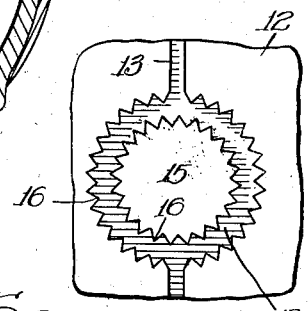
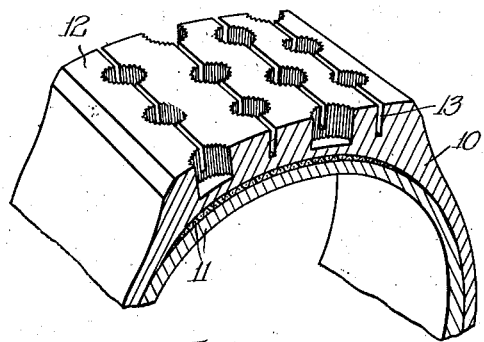
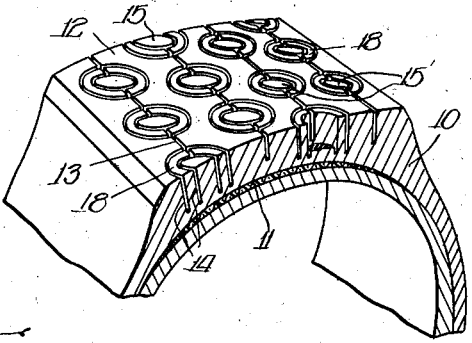
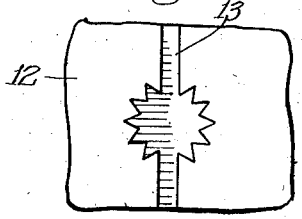
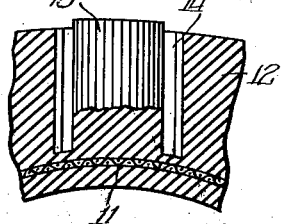
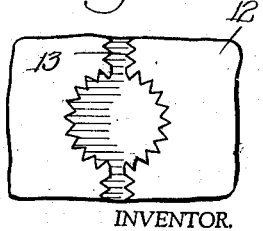
INVENTOR.
Frederick A. Krusemark,
BY
ATTORNEY.

Patented Dec. 23, 1941

2,267,406

UNITED STATES PATENT OFFICE 2,267,406

TIRE

Frederick A. Krusemark, Chicago, Ill.

Application March 1, 1939, Serial No. 259,090

3 Claims. (Cl. 152—209)

This invention relates to tires ordinarily used on vehicles such as automobiles, bicycles, aeroplanes, and any other vehicle employing the ordinary tire. More specifically, this invention has to do with the provision of a construction of tread elements having specific advantages over other tread elements now in use.

In the past it has been extremely difficult to construct a tire that will properly eliminate the heat caused by friction. Many accidents and tire failures are caused by the excessive heat developed particularly at the general vicinity of joinder of the rubber composition constituting the tread elements and the portion of the tire comprising the carcass.

Among other troubles caused by heat, there is the frequent tire failure due to devulcanizing of the tread elements of the tire particularly at vicinity of joinder with the carcass. This is especially true where there is sustained high speed in warm weather, which has become the rule rather than the exception in late years. The tire industry has made every effort to build tires that would "run cooler", such as "low-stretch cord" and rayon cord, and efforts have been made to cool portions of the tire by tread element construction.

It has not been practical to carry rib slots in the tread surface close enough to the carcass to secure maximum cooling efficiency that might be had from such tread slots, because of cracking and splitting of the material from the slots to the carcass. Such cracking and splitting weakens the tire usually causing tire failure within a short while.

Due to heat generated by friction it has been necessary for tire manufacturers to restrict the amount of rubber used in the tread elements so that there has been a lack of effective tread elements long before the useful life of a tire has expired. Present practice of regrooving tires that have become smooth indicates that there is still considerable rubber left without tread non-skid portion. Other practices such as recapping and retreading are likewise due to the inability to construct tread elements and non-skid portions that will last the effective life of the tire carcass.

It is an object of the present invention to provide a cooling arrangement that will effectively cool the tire elements, particularly adjacent the vicinity of joinder of the tread elements to the carcass.

It is an object of my invention to provide tread elements having portions that will conduct heat more rapidly than the ordinary tread elements in use, thereby more rapidly removing the heat from the inner portions of the tire.

It is a further object of my invention to provide an arrangement extending effective cooling slots and openings very close to the carcass, by providing grooves connecting these slots and openings and creating ribs and non-skid elements which do not ordinarily extend as close to the carcass as the slots and openings. This results in the provision of an effective cooling arrangement, maintaining silent operating, provision of longer-lasting non-skid elements, and the elimination of cracking and breaking of the tire.

It is a further object of this invention to provide cooling vanes in connection with the tread elements, resulting in much more rapid elimination of heat than such a construction without the vanes.

Another object of this invention is to provide a tread element having more effective non-skid properties.

It is a further object of the present invention to provide a design that is exceptionally effective for non-skid purposes, has rapid elimination of heat from the tire, is sturdy, and has long-wear qualities.

Other objects and advantages of the invention will appear as the nature of the improvements is better understood, the invention consisting substantially in the novel construction, combination and arrangement of parts hereinafter fully described, illustrated in the accompanying drawing, and finally pointed out in the appended claims.

In the drawing:

Figure 1 is a perspective view of a segment of a tire embodying features of my present invention;

Figure 2 is a fragmentary plan view showing one of the features of the tread element of Figure 1;

Figure 3 is a fragmentary plan view of a modified arrangement, corresponding to Figure 2;

Figure 4 is a fragmentary perspective of a segment of a tire showing a modified construction of the tread elements featuring the present invention;

Figure 5 is a fragmentary sectional upright view of a segment of a tire embodying a modification of the tread elements shown in Figure 1;

Figure 6 is a fragmentary perspective of a segment of a tire showing a modified arrangement of the tread elements;

Figure 7 is a fragmentary plan view of a further modification of the tread elements, corresponding somewhat to the arrangements shown in Figure 6; and Figure 8 is a view corresponding to Figure 7, except that it shows a slightly different arrangement, the rib slot being shown as provided with vanes.

Referring more in detail to the construction shown in the various figures, I have provided the well-known casing or tire 10 having the carcass portion 11. The tread portion in general is numbered 12.

I have provided the rib slots 13, which are comparable, and in general similar to, the ordinary rib slots provided on tires of this nature. It will be observed that these rib slots do not go down as close to the carcass portion as other features of the tread elements shown in this drawing. The purpose of this will be clearly evident from further description.

I have also provided in Figures 1, 2 and 5 the cavities 14, the buttons 15, which buttons are in the cavities abovementioned. The rib slots 13 connect up these cavities 14.

These rib slots 13 are not so deep as the cavities 14, as will be apparent from examination of Figure 1. Carrying the cavities 14 down adjacent the carcass 11 provides ventilation deep enough to reach the area where heat will be most damaging, and, at the same time, the fact that the slots 13 are not carried so close to the carcass as the cavities 14, prevents a crack that might develop in the bottom portion of the cavities 14 due to thinness of tread element or for other reasons, continuing past the limits of the cavities.

The buttons 15, and the sides of the cavities 14 are provided with vanes 16. These vanes preferably, but not necessarily extend to the bottom of the cavities. They perform the function of conducting away heat much more rapidly than would be the case with a smooth wall surface. They also have a tendency to resist gravel and small objects entering the cavities, and have some tendency to cause such objects to work backwards and out. This results in small stones, which would injure the tread surface near the carcass if allowed to work downward, working themselves back out. The prime functions however of these vanes are to provide radiating fins effectively cooling the tire, both because they provide more conducting surface and because they tend to catch the air currents, and operate as effective skid resisting elements.

These vanes may be, in fact preferably are, used in the rib slots 13, as will be more apparent from Figure 8. As is indicated in Figure 1, the cooling holes 17 in the side wall of the tire, are provided with these vanes 16, which vanes add materially to the effectiveness of the cooling holes 17.

In Figures 6, 7, and 8, I have shown the cavities 14 without the buttons 15. These cavities are provided with the vanes 16 on the sides, as best shown in Figure 6. Figure 7 shows the vanes to be somewhat larger than those shown in Figure 6, and are merely modified form of those shown in Figure 6.

Referring next to Figure 3, the construction is somewhat similar to that of Figure 1 but the cooling vanes are differently arranged. The vanes 16 in this figure are shown as being shaped more like the keystone of an arch than triangular, but they perform the same function and effectively assist in cooling the tire and resist skid. The vanes may be more numerous than shown in Figure 3, but do not necessarily need to be, and it is not necessary that they be opposite each other around the cavity 14, and neither is it necessary there be the same number on the button as on the outer circumference of the tread area surrounding the cavity 14.

Referring to Figure 4, the modified construction shows the button 15 surrounded by the cavity 14, one wall of which cavity 14 is formed by the button insert 18. This button insert has a wall, forming its outer circumference, but which wall, in turn, is actually the inner wall of a second cavity. This means that there is a circumferential ring surrounding the inner button with cavity portion between the two and around the outer portion of the circumferential ring. The circumferential ring however preferably has the ribbed slot 13, which ribbed slot generally is not carried all of the way down to the bottom of the cavity 14.

By the construction shown in Figure 4 there is an extra cooling action due to the cavity space and additional wall surface, which is particularly effective since it is extended close to the carcass, and at the same time the "clinging" or "wiping" action of the tread elements is increased by reason of the provision of the extra button insert.

Referring to Figure 5, the button 15 is extended upwardly above the tread element surrounding the button 15. This provides a "knob" which will exert a very effective gripping action on the pavement or other surface over which the tire is traveling, particularly since the knob will yield slightly by bending against the outside edge of the cavity 14 and present an angular edge on the button which will "dig in" on the surface of the road and will exert the so called wiping or clinging action as well as the action of a cleat.

The form of the invention herein shown and described presents a preferred embodiment thereof, and delineates its adaptation to practical use, but it is to be understood that the present disclosure is to be considered from the illustrative standpoint and not as imposing restriction or limitation on the invention.

While I have herein shown and described certain features of my invention, still I do not wish to limit myself thereto, except as I may do so in the claims.

I claim:

1. A tire construction comprising carcass and tread elements, at least a portion of said tread elements comprising cavities, rib slot connections between cavities, buttons in said cavities, and button inserts in said cavities, said rib slot connections extending to a position above the bottom of said cavities, and passing through said button insert, substantially as described.

2. A tire construction comprising carcass and tread elements, at least a portion of said tread elements comprising cavities, rib slot connections between cavities, buttons in said cavities, and button inserts in said cavities, said rib slot connections extending to a position above the bottom of said cavities, substantially as described.

3. A tire construction having carcass and tread elements at least some of said tread elements comprising rib slots, cavities, buttons in said cavities, said rib slots joining a plurality of said cavities, but terminating above the carcass and the bottom of said cavities, said cavities extending to a position closely adjacent to the carcass of said construction, and said cavities and buttons having a plurality of vanes around their side wall portions, substantially as described.

FREDERICK A. KRUSEMARK.